United States Patent [19]
Zwick et al.

[11] Patent Number: 4,852,149
[45] Date of Patent: Jul. 25, 1989

[54] AUTOMATED CALL FILTER

[75] Inventors: Nicholas Zwick, Denville; Charles R. Walden Jr., Montclair; Louis J. Francz, Westfield; Jay L. Gerbehy, Califon, all of N.J.

[73] Assignee: Dialogic Corporation, Parsippany, N.J.

[21] Appl. No.: 213,068

[22] Filed: Jun. 29, 1988

[51] Int. Cl.[4] .................... H04M 3/50; H04M 7/14
[52] U.S. Cl. .................... 379/67; 379/214; 379/216; 379/233
[58] Field of Search .................... 379/67, 88, 89, 213, 379/214, 233, 69, 84, 211, 216

[56] References Cited

U.S. PATENT DOCUMENTS

| 3,111,561 | 11/1963 | Dunning | 379/82 |
| 4,696,028 | 9/1987 | Morganstein et al. | 379/88 |
| 4,797,910 | 1/1989 | Daudelin | 379/67 |
| 4,797,911 | 1/1989 | Szlam et al. | 379/67 |

FOREIGN PATENT DOCUMENTS

| 0054492 | 3/1982 | Japan | 379/211 |
| 0086357 | 5/1984 | Japan | 379/89 |

Primary Examiner—Thomas W. Brown
Attorney, Agent, or Firm—Michael B. Einschlag

[57] ABSTRACT

A Call Filter System (CFS): (1) logically interfaces between a public telephone network and business customer premises equipment; (2) automatically processes incoming and outgoing calls which are amenable to such intervention; and (3) enlists the aid of human intervention on calls requiring such intervention. The CFS includes a network line interface (NLI) for receiving calls from and placing calls to the public telephone network; a premises line interface (PLI) for receiving calls from and placing calls to the business customer premises equipment; a voice processing means (VPM) which is switchably interconnected to the NLI and/or the PLI for translating audio signals transmitted thereto from the NLI or PLI and for transmitting audio signals to the NLI or PLI; a connection and switching means (CSM) for connecting and switching the NLI to either the PLI or VPM and for connecting and switching the PLI to either the NLI or VPM; and a controller for directing the activities of the NLI, PLI, VPM and CSM to automatically process incoming calls to and outgoing calls from the CFS.

24 Claims, 5 Drawing Sheets

AUTOMATED CALL FILTER

TECHNICAL FIELD OF THE INVENTION

The present invention pertains to automated telephone apparatus for use in high volume telephone communications environments, which apparatus automatically filters out and handles requests for service which do not need human intervention to carry out a transaction.

BACKGROUND OF THE INVENTION

There are many businesses, particularly in the service industry, where most, if not all, business transactions are carried out by means of a telephone conversation. As one would expect, such businesses typically create a high volume communications environment. One example where such a high volume communications environment exists is a reservations business such as an airline reservation business where a large number of calls are incoming to the business from the public. Another example where such a high volume communications environment exists is a telemarketing agency where a large number of calls are outgoing from the business to the public.

Such high volume communications environments often operate inefficiently because a finite number of resources from the business enterprise, such as reservations agents, are accessed by more requests from customers than they can handle. Another finite resource is a PBX (Private Business Exchange) or an ACD (Automated Call Distributor) which services incoming and outgoing calls from the business. Such equipment has finite capacities and, in a typical busy situation where there are more requests for resources than are available, blocking or queuing of the requests occurs. This is undesirable because a customer may temporarily be denied service and the business and/or the customer will accumulate telephone transmission charges while waiting. Further, and perhaps most important, no service is being provided during such waiting times.

Commercially available automated systems exist in the market which can handle telephonic functions such as answering calls, placing automated messages on a telephone line, and so forth. For example, Voice Processing Systems (VPS) presently available in the art automatically process transactions or distribute information to users over user interface lines. VPSs presently available in the art typically use Touch-tone, referred to as DTMF, as the means for receiving responses from a user, such responses generally taking the form of commands or input data. In addition, some VPSs are presently available which have the capability of using speech recognition (SR) techniques for receiving spoken user responses and for converting such spoken responses into commands or input data which is in a form that is compatible for computer use. The VPS typically translates customer responses and takes appropriate action is response to user requests or it requests the user to provide further information or further commands. Nevertheless, there is no automated system which interfaces on a logical basis so that it appears to interface between a telephone network, such as the public telephone network, on the one hand and customer's premises equipment, such as a PBX or an ACD, on the other hand to manage the incoming and outgoing calls so that human intervention is used only on those calls which cannot, for some reason, be handled automatically.

As a result, there is a need in the art for an automated call filtering apparatus which: (1) logically interfaces between a telephone network, such as the public telephone network, and customer premises equipment, such as business customer premises equipment; (2) automatically processes incoming and outgoing calls which are amenable to such intervention; and (3) enlists the aid of human intervention on calls which require human intervention.

SUMMARY OF THE INVENTION

Embodiments of the present invention advantageously solve the above-identified problem in the art by providing a Call Filter System (CFS) which: (1) logically interfaces between a telephone network, such as the public telephone network, and customer promises equipment, such as business customer premises equipment; (2) automatically processes incoming and outgoing calls which are amenable to such intervention; and (3) enlists the air of human intervention on calls which require human intervention. Advantageously, as a result of using a CFS, a business environment having a fixed set of resources, i.e., people and/or phone lines, can serve a larger number of requests with increased customer satisfaction and with reduced telephone transmission charges because the CFS will reduce and, in many cases eliminate, waiting time.

An embodiment of the inventive CFS for logically interfacing between a telephone network and a customer premises equipment comprises: at least one network line interface for receiving calls from and placing calls to the telephone network in response to commands from a controller means; at least one premises line interface for receiving calls from and placing calls to the customer premises equipment in response to commands from the controller means; at least one voice processing means which is switchably interconnected to at least one of the network line interfaces and at least one of the premises line interfaces for translating audio signals transmitted thereto from the at least one network line interface or the at least one premises line interfaces, for transmitting such translations to the controller means, and for transmitting audio signals, in response to commands and information sent thereto from the controller means, to the at least one network line interface or the at least one premises line interface; and a connection and switching means, in response to commands from the controller means, for connecting and switching the network line interfaces to either the premises line interfaces or the voice processing means and for connecting and switching the premises line interfaces to either the network line interfaces or the voice processing means; wherein the controller means has the capability to: (a) cause an incoming call from a calling party to a network line interface from the telephone network to be answered by interaction with the network line interface, a voice processing means and the connection and switching means and (b) either provide further signals to the calling party or causes the calling party to be connected with a predetermined called party by interaction with a premises line interface, a voice processing means, and the connection and switching means and wherein the controller means has the further capability to: (a) place an outgoing call to a called party over the telephone network by interaction with a network line interface, a voice processing means and the connection and switching means and (b) either provide further signals to the called party or to cause the called party to be connected with a predetermined calling party who is connected to a premises line interface by interaction with a premises line interface, a voice processing means, and the connection and switching means.

In another embodiment of the present invention, the controller means comprises means, in connection with a network line interface, a voice processing means and the connection and switching means, for conducting at least a portion of a dialogue with the calling and/or called party.

In yet another embodiment of the present invention, the controller means further comprises means for connecting the calling and/or called party with a predetermined party connected to a premises line interface at a predetermined portion of the dialogue.

In still yet another embodiment of the present invention, the controller means is connected to a communications interface which is, in turn, connected to a host computer. The host computer can thereby transmit commands and data and can receive data from the controller means. in such an embodiment some or all of the logic which is used to control the automatic processing of incoming or outgoing calls may be handled by the host computer. Further, a data base may be stored at the host computer and information may be sent thereto to and from the controller means.

BRIEF DESCRIPTION OF THE DRAWING

A complete understanding of the present invention may be gained by considering the following detailed description in conjunction with the accompanying drawing, in which.

DETAILED DESCRIPTION

Figure 1:
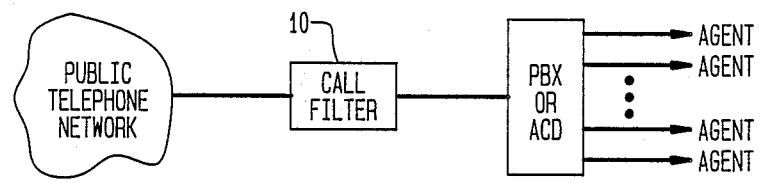
FIG. 1 shows, in pictorial form, the logical placement of an inventive Call Filtering System (CFS) in a business environment.

FIG. 1 shows the logical placement of Call Filtering System 10 (CFS 10) between a public telephone network on the one hand and a business customer premises equipment on the other hand.

Figure 2:
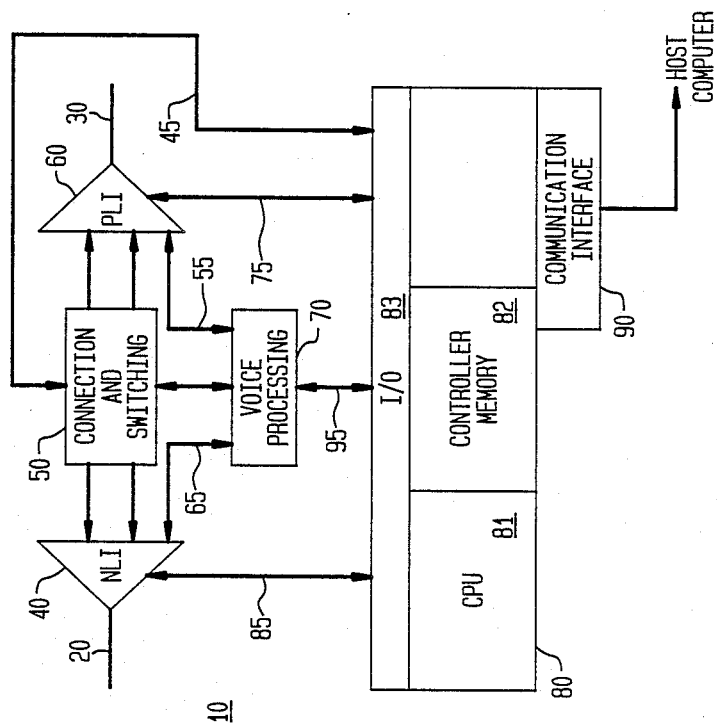
FIG. 2 shows a block diagram of an embodiment of the inventive CFS.

FIG. 2 shows a block diagram of CFS 10 fabricated in accordance with the present invention. CFS 10 is connected by lines 20 to the public telephone network and by lines 30 to business customer premises equipment such as a PBX (private Business Exchange), an ACD (Automated Call Distributor) and so forth.

As shown in FIG. 2, CFS 10 comprises network line interface 40 (NLI 40). NLI 40 provides access over lines 20 from CFS 10 to the public telephone network and vice versa. In accordance with the present invention, NLI 40 appears physically identical to the public telephone network interface at a PBX, ACD, and so forth. Further, although NLI 40 may operate on an analog or digital basis, it must be capable of performing the following functions. It must: (1) recognize an incoming request for service from a calling party using the public telephone network over lines 20 and be able to report same to controller 80 of CFS 10 over lines 85; (2) acknowledge a request for service from the public telephone network over lines 20 in response to commands transmitted thereto over lines 85 from controller 80; (3) make a request for service to the public telephone network over lines 20 in response to commands transmitted thereto over lines 85 from controller 80; and (4) dial a telephone number to a called party into the public telephone network over lines 20 in response to commands transmitted thereto over lines 85 from controller 80 and to detect when the called party has answered. Note that in some embodiments, some of lines 20 may service a single party and/or others of lines 20 may service a multiplicity of parties of means of a multiplex scheme such as that used on a T1 digital carrier. Embodiments of NLI 40 are commercially available in the art. For example, in a preferred embodiment, one may utilize digital telephony interface DTI/124 available from Dialogic Corporation, 129 Littleton Road, Parsippany, N.J. 07054.

As shown in FIG. 2, CFS 10 comprises premises line interface 60 (PLI60). PLI 60 provides access over lines 30 from CFS 10 to business customer premises equipment and vice versa. In accordance with the present invention, PLI 60 appears physically identical to the public telephone network interface that a PBX, ACD, and so forth would normally interface to, i.e., PLI 60 "presents" the public telephone network to the PBX, ACD, and so forth. Further, although PLI 60 may operate on an analog or digital basis, it must be capable of performing the following functions. It must: (1) recognize a request for service from the business customer premises equipment over lines 30 and be able to report same to controller 80 over lines 75; (2) acknowledge a request for service from the business customer premises equipment over lines 30 in response to commands transmitted thereto over lines 75 from controller 80; (3) make a request for service to the business customer premises equipment over lines 30 in response to commands transmitted thereto over lines 75 from controller 80; and (4) dial a telephone number into the business customer premises equipment over lines 30 in response to commands transmitted thereto over lines 75 from controller 80 and to detect when the called party, in this case the business agent, has answered. Note that in some embodiments, some of lines 30 may service a single party and/or others of lines 30 may service a multiplicity of parties by means of a multiplex scheme such as that used on a T1 digital carrier. Embodiments of PLI 60 are commercially available in the art. For example, in a preferred embodiment, one may utilize digital telephony interface DTI/124 available from Dialogic Corporation, 129 Littleton Road, Parsippany, N.J. 07054.

As shown in FIG. 2, CFS 10 comprises voice processing means 70 (VPM 70). VPM 70 provides the following functions. It must: (1) generate digitally synthesized voice and progress tone output signals for transmission to NLI 40 over lines 65 for ultimate transmission to the public telephone network over lines 20 in response to commands from controller 80 over lines 95; (2) detect and decode addressing, i.e., telephone numbers, call progress signals and other identification signals received from (a) the public telephone network over lines 20 and transmitted to VPM 70 over lines 65 and (b) the business customer premises equipment over lines 30 and transmitted to VPM 70 over lines 55 and transmit same to controller 80 over lines 95; and (3) optionally, record or digitize audio messages such as speech under the direction of commands received from controller 80 over lines 95, which audio messages are received from (a) the public telephone network over lines 20 and transmitted to VPM 70 over lines 65 and (b) the business customer premises equipment over lines 30 and transmitted to VPM 70 over lines 55. Embodiments of VPM 70 are commercially available in the art. For example, in a preferred embodiment, one may utilize voice communication system DIALOG/41B available from Dialogic Corporation, 129 Littleton Road, Parsippany, N.J. 07054. Note that the specific number of VPM's used in a particular embodiment depends on the number of parties one needs to handle.

As shown in FIG. 2, CFS 10 comprises connection and switching means 50 (CMS 50). CSM 50 provides the function of connecting and switching, on an analog or digital basis, individual circuits in NLI 40 to individual voice processing circuits within VPM 70 or to individual circuits in PLI 60, all in response to commands transmitted thereto over lines 45 from controller 80. Embodiments of CSM 50 are commercially available in the art. For example, in a preferred embodiment, one may utilize a portion of DTI/124 referred to above to switch by means of time-division multiplex (TDM) switching. The DTI/124 permits switching between a T-1 digital telephony interface input which carries 24 telephone conversations and either an expansion bus on controller 80 which connects, in turn, to PLI 60 or to any of the voice processing circuits of VPM 70.

Finally, as shown in FIG. 2, CFS 10 comprises controller 80. Controller 80, as should be evident from the above, manages and coordinates the activity of the components of CFS 10. Controller 80 comprises the following parts: a central processing unit 81 (CPU 81), memory 82, and I/O interfaces 83. In addition, controller 80 may optionally further comprise a data base and/or communications interface 90 for communication with an external computer which itself may have a data base. In a preferred embodiment, controller 80 is an IBM compatible personal computer (PC) or similar unit which is commercially available from many sources. In addition, optional communications interface 90 can be obtained commercially from many sources such as from DCA of Alpharetta, Georgia, AST of Irvine, Calif. and so forth.

Figure 3:
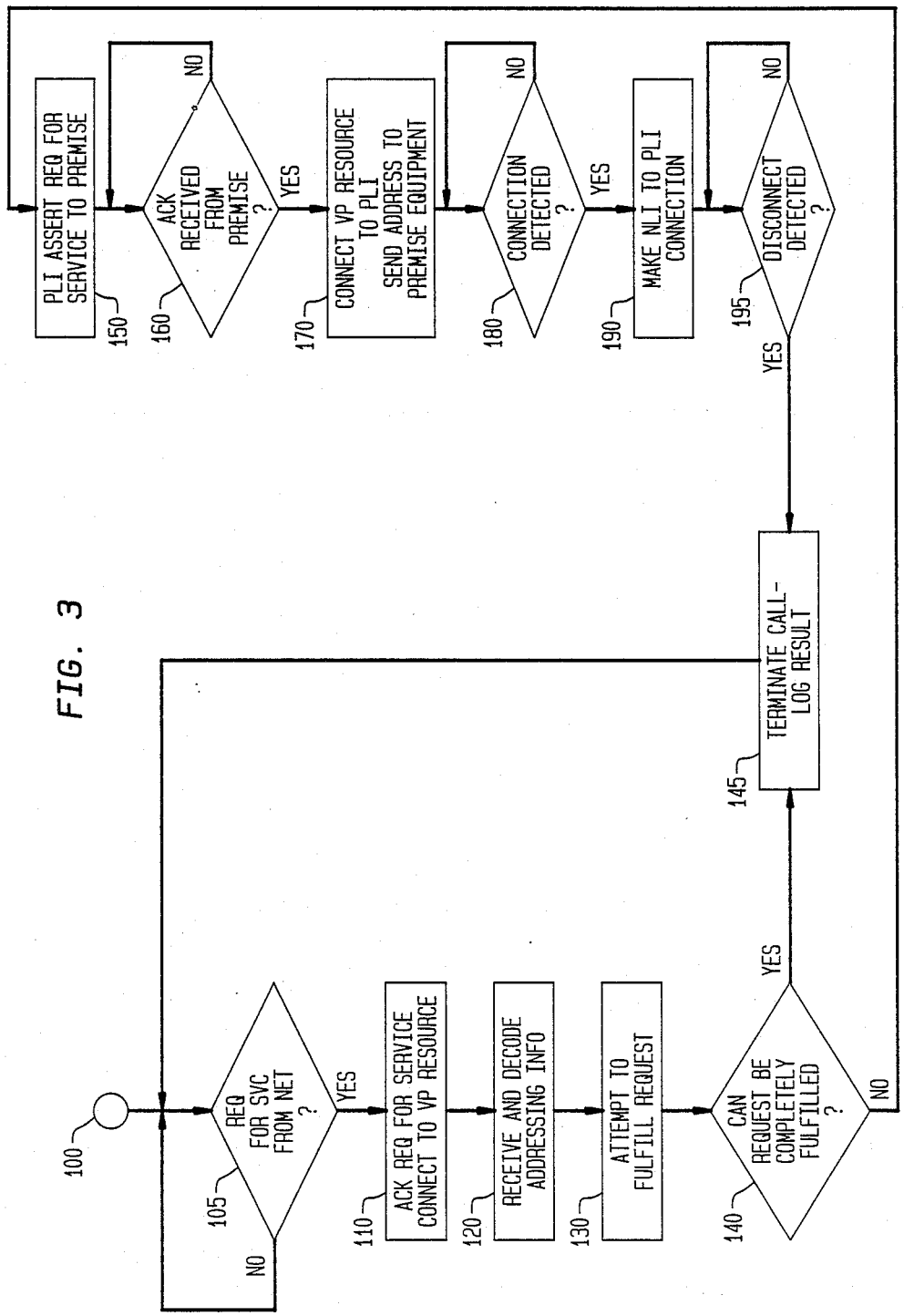
FIG. 3 shows, a flow chart of the operation of the inventive CFS in handling an incoming call.
Figure 4:
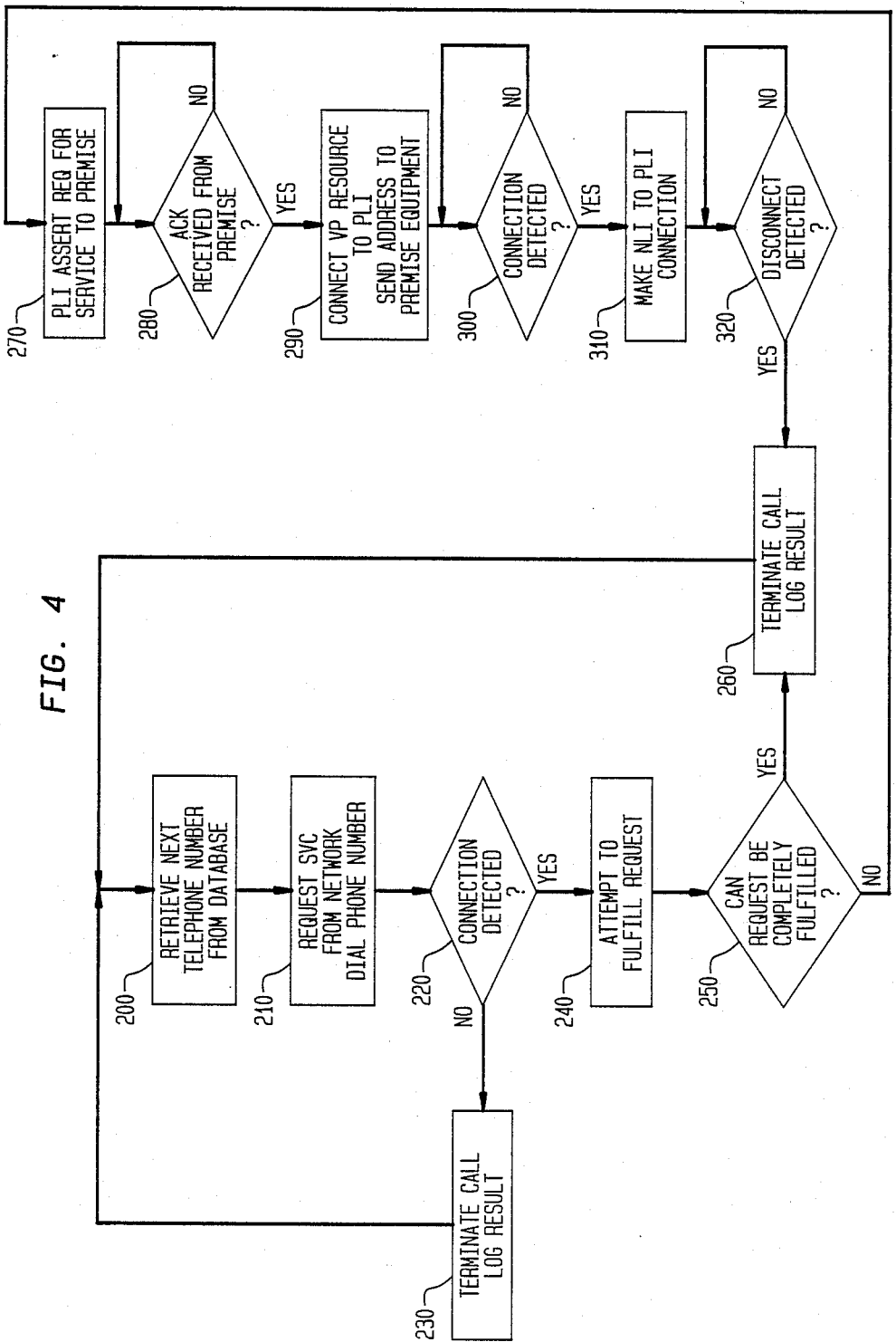
FIG. 4 shows a flow chart of the operation of the inventive CFS in handling an outgoing call.

The following describes the operation of CFS 10 for handling an inbound call and for handling an outbound call with reference to FIGS. 3 and 4, respectively.

We will now describe the manner in which CFS 10 handles an incoming call with reference to FIG. 3. At point 100, CFS 10 is waiting for a request for service from a calling party over the public telephone network. Such requests, as is well known to those of ordinary skill in the art, are typically made in the form of the application of a ringing signal in an analog interface to the public telephone network or in the form of a signalling bit transition in a digital interface to the public telephone network. Such requests are received, detected and decoded by NLI 40, see decision box 105. For example, NLI 40 may detect an incoming telephone call from a customer who is requesting service from CFS 10 by detecting loop current in the telephone line accessed by the customer and by transmitting that fact to controller 80. NLI 40 transmits a message that a request for service has been detected to controller 80 over lines 85. At point 110, after receiving the message from NLI 40 that a request for service has been detected, controller 80 sends a command to CSM 50 over lines 45 to connect a voice processing circuit in VPM 70 to the circuit in NLI 40 which has the request pending. Then controller 80 sends a command to NLI 40 over lines 85 to cause it to acknowledge the request for service. Such acknowledgement, as is well known in the art, generally takes the form of an "off hook" signal presented to the public telephone network in an analog interface or such acknowledgement, as is well known in the art, generally takes the form of the momentary application of a signalling bit toward the public telephone network in a digital interface.

As shown at point 120, VPM 70 receives and decodes any addressing signals that may be sent from the public telephone network. As is well known in the art, such addressing signals can take the form of dial pulse digits, dual tone multi-frequency (DTMF) digits, multi-frequency (MF) digits or common channel signalling. Such signals will typically be present in DID (direct-inward-dial), DNIS (dialed-number-identification-service), ANI (automatic-number-identification) or ISDN (integrated Services Digital Network) networks and are used, as is well known to those of ordinary skill in the art to automatically identify the type of service requested, i.e., the purpose of the call. Alternatively, if such automated services are not available, VPM 70 can be commanded by controller 80, in a manner well known to those of ordinary skill in the art, to output a voice message—prepared by the business customer in accordance with methods well known in the art—to prompt the calling party. The calling party, in response to the automated prompt, will manually enter a DTMF signal to identify the purpose of the call. The DTMF will then be received and decoded by VPM 70 and a message will then be transmitted to controller 80 over lines 95.

As shown at point 130, controller 80, in conjunction with VPM 70, will attempt to fulfill the customer's request. This will be done in a manner well known in the art by completing a dialogue with the customer. A dialogue, typically referred to as a user/system dialogue, consists of a series of specific questions transmitted from the system to the user and responses transmitted from the user to the system in the form of commands or input data. The system typically translates the responses and takes appropriate action in response to a command or requests the user to provide further information or further commands. Voice processing means presently available in the art typically use Touch-tone, referred to as DTMF, as the means for receiving responses from the user, such responses generally taking the form of commands or input data. Thus, customer inputs by means of DTMF are received and decoded by VPM 70 and CFS 10 outputs to the customer are made by means of voice prompts send to the customer by VPM 70. The "state control" for such dialogues can reside, as is well known to those of ordinary skill in the art, within controller 80 and can be exercised from a combination of CPU 81, memory 82 and a data base or the "state control" can reside in a host computer (not shown) and be communicated to controller 80 by means of optional communications interface 90. It should be understood that inventive CFS 10 is not restricted to customers that can only transmit DTMF. In fact, CFS 10 may include within VPM 70 speech recognition (SR) equipments which are well known to those of ordinary skill in the art for receiving spoken user responses and for converting such spoken responses into commands or input data which is in a form that is compatible for computer use. In such a case, the dialogue between the customer and CFS 10 is accomplished by a dialogue wherein CFS 10 transmits voice prompts to the customer and the customer responds in normal speech. Such a system for carrying out dialogues by means of DTMF and/or SR has been disclosed in a patent application which is commonly assigned with this application, is entitled "Interactive Voice Processing With Speech Recognition," was filed Feb. 26, 1988, and has Ser. No. 160,820.

As shown at point 140, controller 80 will determine whether or not the customer's request for service has been completely fulfilled by CFS 10. If it has, the call is terminated by controller 80 by sending a command to NLI 40 to "hang up" the telephone by presenting and "on hook" signal to the public telephone network in a manner well known to those of ordinary skill in the art, see point 145. Further, in accordance with methods well known in the art, controller 80 may log the transaction between the customer and CFS 10 to provide data for future use of system designers or to determine system blockages and so forth. In addition, controller 80 may update a local data base (not shown) in accordance with methods well known in the art or it may transmit data over optional communications interface 90 where a host-computer-based data base may be updated.

If the customer's request cannot be completely fulfilled by CFS 10, controller 80 sends a command to PLI 60 over lines 75 to place a request for service to a premises telephone equipment at point 150. As shown at point 160, PLI 60 waits to receive acknowledgement of its request for service from the business customer's premises equipment.

At point 170, and PLI 60 receives acknowledgement of its request for service and transmits that information to controller 80, controller 80 commands: (1) CSM 50 to connect a voice processing circuit from VPM 70 to the active circuit in PLI 60 that is connected to the business premises equipment—in this embodiment this advantageously permits VPM 70 to perform the signalling—and (2) PLI 60 to transmit any required addressing signals, such as telephone number to the business customer's premises equipment. Further, at point 180, PLI 60 awaits detection of a signal from PLI 60 which confirms the fact that a connection has been made to a premises equipment. Optionally, controller 80 will command VPM 70 to send a voice announcement to the addressed party in the business premises.

At point 190, controller 80 commands CSM 50 to disconnect VPM 70 from PLI 60 and to connect the customer circuit connected to NLI 40 to the business equipment connected to PLI 60. As shown at point 195, this connection remains intact until NLI 40 detects a disconnect signal from the public telephone network indicating that the calling party has hung up or until PLI 60 detects a disconnect signal from the business customer premises equipment indicating that the business agent has hung up.

As shown at point 145, controller 80 commands CSM 50 to remove the connection between NLI 40 and PLI 60 and commands NLI 40 and PLI 60 to signal appropriate disconnects.

We will now described the manner in which CFS 10 handles an outgoing call with reference to FIG. 4. At point 200, CFS 10 retrieves the next telephone number to be called from a data base (not shown). The data base is typically maintained in an external host computer and is accessed therefrom by controller 80 in a manner well known to those of ordinary skill in the art via communications interface 90. As shown at point 210, once the telephone number is obtained, controller 80 selects an available port in NLI 40 and commands it, over lines 85, to request service from the public telephone network in a manner well known to those of ordinary skill in the art by, for example, going "off hook." when the network acknowledges this request, controller 80 commands NLI 40 to transmit the selected telephone number, i.e., the selected telephone number address by MF, DTMF, dial pulses, common channel signalling and so forth, to the public telephone network.

As shown at point 220, controller 80 sends a command to CSM 50 to connect an available voice processing circuit in VPM 70 to the active port in NLM 40. This voice processing circuit will be used to analyze the progress tones produced by the public telephone network while the call is being attempted. If the port in NLM 40 detects a connection signal then the operation continues at point 240. However, if the voice processing call progress tone decoder logic determines, in a manner well known to those of ordinary skill in the art, that no connection can be made at this time, this result is reported to controller 80 at point 230. Controller 80, in turn, reports this information to the host computer via communications interface 90 and then commands NLI 40 to terminate the call by, for example, presenting an "on hook" signal to the public telephone network. Then processing continues at point 200.

As shown at point 240, a voice processing circuit in VPM 70, in response to commands from controller 80, will attempt to fulfill the request in an automated fashion as described above by completeing a dialogue. Further, as above, the state control for this dialogue can reside within the logic of controller 80 or it can be contained in a host computer and be communicated thereto by means of optional communications interface 90.

As shown at point 250, controller 80 will determine whether or not the request has been completely fulfilled by CFS 10. If it has, the call is terminated by controller 80 by sending a command to NLI 40 to "hang up" the telephone by presenting an "on hook" signal to the public telephone network in a manner well known to those of ordinary skill in the art, see point 260. Further, in accordance with methods well known in the art, controller 80 may log the transaction between the customer and CFS 10 to provide data for future use of system designers or to determine system blockages and so forth. In addition, controller 80 may update a local data base (not shown) in accordance with methods well known in the art or it may transmit data over optional communications interface 90 where a hostcomputer-based data base may be updated.

If the customer's request cannot be completely fulfilled by CFS 10, controller 80 sends a command to PLI 60 over lines 75 to place a request for service to a premises telephone equipment at point 270. As shown at point 280, PLI 60 waits to receive acknowledgement of its request for service form the business customer's premises equipment.

At point 290, after PLI 60 receives acknowledgement of its request for service and transmits that information to controller 80, controller 80 commands PLI 60 to transmit any required addressing signals, such as telephone number, to the business customer's premises equipment. Further, at point 300, PLI 60 awaits detection of a signal from PLI 60 which confirms the fact that a connection has been made to a premises equipment agent. Optionally, at this point, controller 80 may command CSM 50 to connect a voice processing circuit from VPM 70 to the active circuit in PLI 60 which is connected to the business premises equipment. Then controller 80 will command VPM 70 to send a voice announcement to the addressed party in the business premises.

At point 310, controller 80 commands CSM 50 to disconnect VPM 70 from PLI 60 and to connect the customer circuit connected to NLI 40 to the business equipment connected to PLI 60. As shown at point 320, this connection remains intact until NLI 40 detects a disconnect signal from the public telephone network indicating that the customer has hung up or until PLI 60 detects a disconnect signal from the business customer premises equipment indicating that the business agent has hung up.

As shown at point 320, controller 80 commands CSM 50 to remove the connection between NLI 40 and PLI 60 and commands NLI 40 and PLI 60 to signal appropriate disconnects. Then the transaction is logged and the operation continues at point 200.

As one can readily appreciate from the above, CFS 10 conserves resources by automatically handing as many calls for service as it has the capability of doing. This reduces call waiting because a customer immediately receives service without having to wait for a business agent. Further, a business agent who places outgoing calls does not have to provide service unless a customer is on line, thereby reducing their waiting time and only have to respond to calls which cannot be handled automatically.

Figure 5:
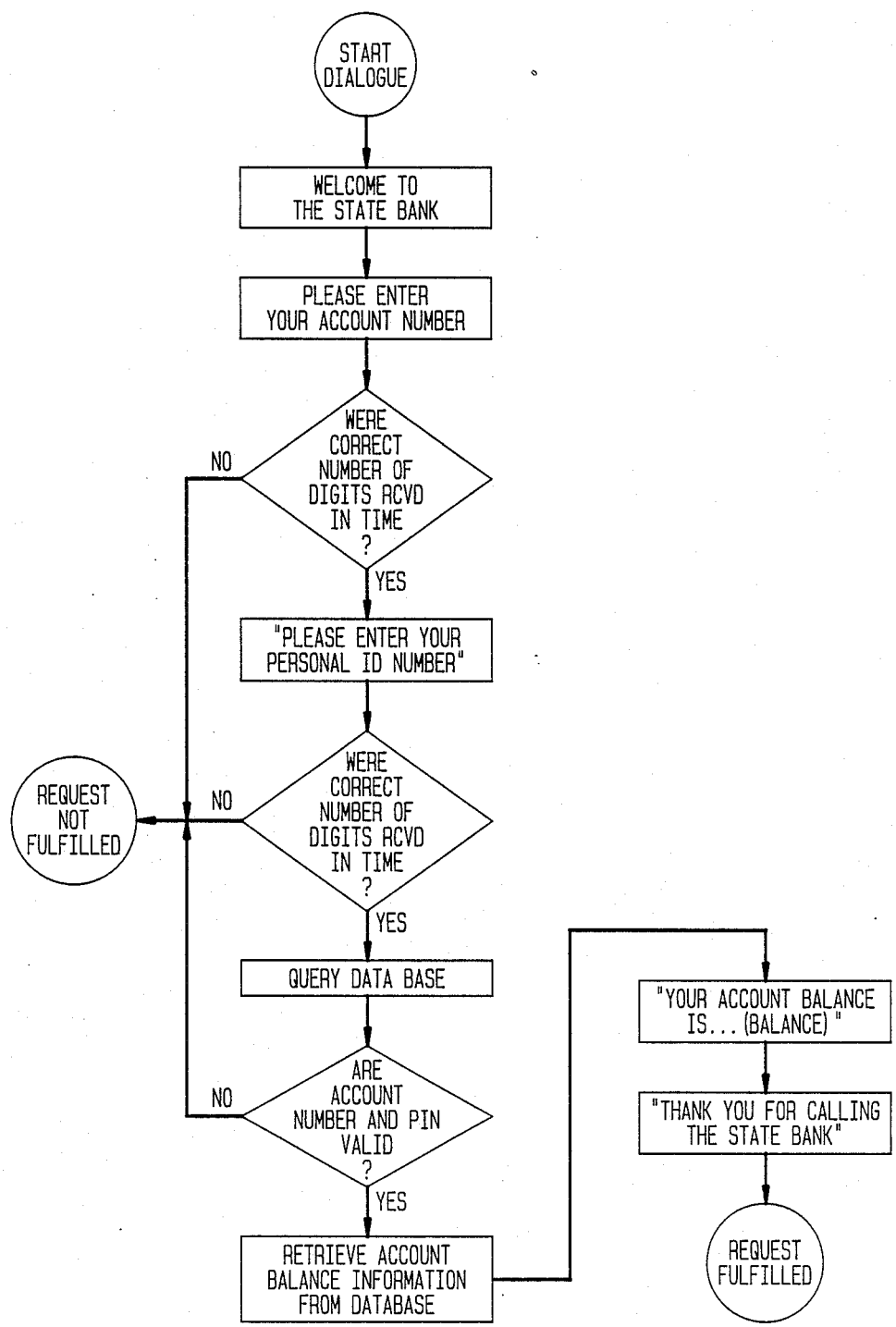
FIG. 5 shows a flow chart for a typical user dialogue for use with the inventive CFS.

The inventive CFS is not restricted for use with only specific user/system dialogues. For example, the user/system dialogue which takes place at point 130 of FIG. 3 and at point 240 of FIG. 4 are usually unique for each business that utilizes the CFS. It is well known in the art how such dialogues are created. In particular, a dialogue is created by: (1) defining the transactioal flow of a customer's request; (2) defining the appropriate scripts which implement the transactional flow; (3) coding the state control logic to implement the script; and (4) preparing and loading the voice prompts into the CFS which are required for use in the scripts. Step (1) of defining the transactional flow is best performed by the business which will use the CFS by drawing a flow chart or similar diagram which describes the transactional flow. For example, FIG. 5 shows a flow chart for a typical user dialogue in a banking application for use with the inventive CFS. Steps (2) and (3) of defining scripts and coding the state control logic to implement the scripts is best carried out by using one of several "application generators" which are commercially available for this purpose. These software products allow the user to code the scripts by filling in the blank fields in menus or tables. After this, the "application generator" produces the code for the state control logic. Several of these products are listed and described in "PC-Based Voice Processing Software Tools" by Tetschner, in the March/April 1988 issue of Speech Technology Magazine published by Media Dimensions. Lastly, step (4) of preparing and loading the voice prompts into the CFS is best carried out by having a professional announcer produce an audio tape at a sound studio using the script created in step (2). Then one uses a product such as the Voice Editing Toolkit which is commercially available from Dialogic Corporation, 129 Littleton Road, Parsippany, N.J. 07054 to digitize, edit and load the voice prompts into the CFS.

Note that the embodiment of the inventive CFS disclosed above takes advantage of a time-division-multiplexer which is contained in the DTI/124 commercially available apparatus which may be used to embody CSM 50. However, the inventive CFS may also be implemented when one uses an equal number of NLI circuits, PLI circuits and VPM circuits. In such embodiments there may be no need for a connection and switching means because the various resources can be connected together on a one to one basis.

Further, those skilled in the art recognize that further embodiments of the present invention may be made without departing from its teachings. For example, the inventive CFS can be used with any application that requires an interface with a multiplicity of users and is not restricted to analog or digital interfaces over telephone lines.

What is claimed is:

1. A call filter apparatus for interfacing between a telephone network and customer on-premises equipment which comprises:

at least one network line interface for receiving calls from and for placing calls to the telephone network in response to commands from a controller means;

at least one premises line interface for receiving calls from and placing calls to the on-premises equipment in response to commands from the controller means;

at least one voice processing means which is switchably interconnected to the at least one network line interface and the at least one premises line interface for translating audio signals transmitted thereto from the at least one network line interface or the at least one premises line interface, for transmitting such translations to the controller means, and for transmitting audio signals, in response to commands and information sent thereto from the controller means, to the at least one network line interface or the at least one premises line interface; and a connection and switching means, in response to commands from the controller means, for connecting and switching the at least one network line interface to either the at least one premises line interface or the at least one voice processing means and for connecting and switching the at least one premises line interface to either the at least one network line interface or the at least one voice processing means;

wherein the controller means comprises means which (a) causes an incoming call from a calling party to the at least one network line interface from the telephone network to be answered by interaction with the at least one network line interface, the at least one voice processing means and the connection and switching means and (b) either provides further signals to the calling party or causes the calling party to be connected with a predetermined called party by interaction with the at least one premises line interface, the at least one voice processing means, and the connection and switching means; and wherein the controller means comprises means which (a) places an outgoing call to a called party over the telephone network by interaction with the at least one network line interface, the at least one voice processing means and the connection and switching means and (b) either provides further signals to the called party or causes the called party to be connected with a predetermined calling party who is connected to the at least one premises line interface by interaction with the at least one premises line interface, the at least one voice processing means, and the connection and switching means.

2. The call filter apparatus of claim 1 wherein the controller means further comprises means, in connection with the at least one network line interface, the at least one voice processing means and the connection and switching means, for conducting at least a portion of the dialogue with the calling or called party.

3. The call filter apparatus of claim 2 wherein the controller means further comprises means for causing the calling or called party to be connected with a predetermined party who is connected to the at least one premises line interface at a predetermined portion of the dialogue by interaction with the connection and switching means, the at least one voice processing means, and the at least one premises line interface.

4. The call filter apparatus of claim 1 which further comprises a communications interface connected to the controller means and wherein the controller means further comprises means, in response to commands and information received over the communications interface and in connection with the at least one network line interface, the at least one voice processing means and the connection and switching means, for conducting at least a portion of a dialogue with the calling or called party.

5. The call filter apparatus of claim 4 wherein the controller means further comprises means, in response to commands and information received over the communications interface, for causing the calling or called party to be connected with a predetermined party who is connected to the at least one premises line interface at a predetermined portion of the dialogue by interaction with the connection and switching means, the at least one voice processing means, and the at least one premises line interface.

6. The call filter apparatus of claim 2 wherein the controller means further comprises means for storing, inserting and retrieving information from a data base.

7. The call filter apparatus of claim 4 wherein the controller means further comprises means for sending or retrieving information to or from a data base by means of the communications interface.

8. The call filter apparatus of claim 1 wherein the at least one network line interface receives and places calls in digital form.

9. The call filter apparatus of claim 1 wherein the at least one network line interface receives and places calls in analog form.

10. The call filter apparatus of claim 1 wherein the at least one premises line interface receives and places calls in digital form.

11. The call filter apparatus of claim 1 wherein the at least one premises line interface receives and places calls in analog form.

12. The call filter apparatus of claim 1 wherein the connection and switching means connects and switches in digital form.

13. The call filter apparatus of claim 1 wherein the connection and switching means connects and switches in analog form.

14. A call filter apparatus for interfacing between a telephone network and customer on-premises equipment which comprises:
at least one network line interface for receiving calls from and for placing calls to the telephone network in response to commands from a controller means, the at least one network line interface being connected to at least one premises line interface for receiving calls from and placing calls to the on-premises equipment in response to commands from the controller means;
at least one voice processing means which is connected to the at least one network line interface and to the at least one premises line interface for translating audio signals transmitted thereto from the at least one network line interface or the at least one premises line interface, for transmitting such translations to the controller means, and for transmitting audio signals, in response to commands and information sent thereto from the controller means, to the at least one network line interface or the at least one premises line interface; and
wherein the controller means comprises means which (a) causes an incoming call from a calling party to the at least one network line interface from the telephone network to be answered by interaction with the at least one network line interface and the at least one voice processing means and (b) either provides further signals to the calling party or causes the calling party to be connected with a predetermined called party by interaction with the at least one premises line interface and the at least one voice processing means; and
wherein the controller means comprises means which (a) places an outgoing call to a called party over the telephone network by interaction with the at least one network line interface and the at least one voice processing means and (b) either provides further signals to the called party or causes the called party to be connected with a predetermined calling party who is connected to the at least one premises line interface by interaction with the at least one premises line interface and the at least one voice processing means.

15. The call filter apparatus of claim 14 wherein the controller means further comprises means, in connection with the at least one network line interface and the at least one voice processing means, for conducting at least a portion of a dialogue with the calling or called party.

16. The call filter apparatus of claim 15 wherein the controller means further comprises means for causing the calling or called party to be connected with a predetermined party who is connected to the at least one premises line interface at a predetermined portion of the dialogue by interaction with the at least one voice processing means and the at least one premises line interface.

17. The call filter apparatus of claim 14 which further comprises a communications interface connected to the controller means and wherein the controller means further comprises means, in response to commands and information received over the communications interface and in connection with the at least one network line interface and the at least one voice processing means, for conducting at least a portion of a dialogue with the calling or called party.

18. The call filter apparatus of claim 17 wherein the controller means further comprises means, in response to commands and information received over the communications interface, for causing the calling or called party to be connected with a predetermined party who is connected to the at least one premises line interface at a predetermined portion of the dialogue by interaction with the at least one voice processing means and the at least one premises line interface.

19. The call filter apparatus of claim 15 wherein the controller means further comprises means of restoring, inserting and retrieving information from a data base.

20. The call filter apparatus of claim 17 wherein the controller means further comprises means for sending or retrieving information to or from a data base by means of the communications interface.

21. The call filter apparatus of claim 14 wherein the at least one network line interface receives and places calls in digital form.

22. The call filter apparatus of claim 14 wherein the at least one network line interface receives and places calls in analog form.

23. The call filter apparatus of claim 14 wherein the at least one premises line interface receives and places calls in digital form.

24. The call filter apparatus of claim 14 wherein the at least one premises line interface receives and places calls in analog form.

* * * * *